US010364567B2

(12) United States Patent
Shang

(10) Patent No.: US 10,364,567 B2
(45) Date of Patent: Jul. 30, 2019

(54) CONNECTOR FOR FRAMING MATERIAL

(71) Applicant: Song-Ping Shang, Taichung (TW)

(72) Inventor: Song-Ping Shang, Taichung (TW)

( * ) Notice: Subject to any disclaimer, the term of this patent is extended or adjusted under 35 U.S.C. 154(b) by 0 days.

(21) Appl. No.: 15/854,730

(22) Filed: Dec. 26, 2017

(65) Prior Publication Data

US 2018/0187411 A1 Jul. 5, 2018

(30) Foreign Application Priority Data

Dec. 30, 2016 (TW) .............................. 105144106 A

(51) Int. Cl.
| | |
|---|---|
| *E04B 1/41* | (2006.01) |
| *F16B 37/04* | (2006.01) |
| *E04B 1/58* | (2006.01) |
| *F16B 7/18* | (2006.01) |
| *H02S 20/24* | (2014.01) |
| *E04B 1/38* | (2006.01) |

(52) U.S. Cl.
CPC .............. *E04B 1/40* (2013.01); *E04B 1/5818* (2013.01); *F16B 7/187* (2013.01); *F16B 37/045* (2013.01); *E04B 2001/405* (2013.01); *E04B 2001/5887* (2013.01); *E04B 2103/06* (2013.01); *H02S 20/24* (2014.12); *Y02E 10/47* (2013.01)

(58) Field of Classification Search
CPC ................. E04B 1/5818; E04B 1/2403; E04B 2001/2415
See application file for complete search history.

(56) References Cited

U.S. PATENT DOCUMENTS

| | | | | |
|---|---|---|---|---|
| 7,070,374 B2 * | 7/2006 | Womack | ............... | B60P 7/0815 410/104 |
| 2015/0322669 A1 * | 11/2015 | Shih | ......................... | E04B 1/40 52/698 |
| 2018/0030717 A1 * | 2/2018 | Yang | ..................... | E04B 1/2403 |

\* cited by examiner

*Primary Examiner* — Amy J. Sterling

(57) ABSTRACT

A connector for framing material comprises: a limiting member, a connecting member and a first screw. The hexagon portion of the first screw is received between the first stopping plate and the second stopping plate of the limiting member. The through hole of the connecting member is passed by the first screw to form a pre-lock assembly of the limiting member and the connecting member. The first stopping plate and the second stopping plate parallel to the accepting slot direction to place the limiting member in the U-shaped frame, and then the connecting member is rotated and to make a cross with the U-shaped frame, such that the first screw drives the limiting member to rotate to perpendicular to the U-shaped frame.

9 Claims, 16 Drawing Sheets

US 10,364,567 B2

CONNECTOR FOR FRAMING MATERIAL

BACKGROUND OF THE INVENTION

1. Field of the Invention

The present invention relates to a connector for framing material, and more particularly to a connector that is low cost and easy to assemble.

2. Description of the Related Art

According to the prior art, a steel frame connector comprises a connecting board 71, a solid block 72, a spring 73 and a screw 74, as shown in FIGS. 24 and 25. A through hole 711 is disposed on the connecting board 71. The solid block 72 has a certain thickness for opening a screw hole 721 and a groove 722 is respectively recessed on both sides of the solid block 721. The screw 74 passes through the through hole 711 on the connecting plate 711 and engages with the screw hole 721 on solid block 72 and the spring 73 is disposed at one end of the solid block 72. For assembly, the solid block 72 and the spring 73 need to be placed in a U-shaped frame 80 separately and then rotate inside of the U-shaped frame 80 to cause the spring 73 to push the solid block 72. Afterward, the groove 722 of the solid block 72 can be engaged with a hook 81 of the U-shaped frame 80 so the solid block 72 is able to be locked by the screw 74 easily. For the combination of the connecting plate 71, the solid block 72, the spring 73 and the screw 74 together to the U-shaped frame 80, the screw 74 and the solid block 72 don't have interlocking effect effectively causes the user needs to insert the finger into the U-shaped frame 80 to rotate the solid block 72. Therefore, it is obviously difficult to operate. During the assembly, the connection board 71 blocks the line of sight of the solid block 72, resulting in the possibility that the groove 722 of the solid block 72 is not properly engaged with the U-shaped frame 80, so that the assembly strength is reduced or easily detached. The solid block 72 has a certain volume in order to be able to have a screw hole 721, which causes higher processing and material costs. Since the solid block 72 is not suitable for pre-assembled onto the connecting board 71, it is customary to combine and lock at the same time in the field construction, and the method will consume a large amount of assembly time of construction workers which results in high assembly costs. Therefore, the prior art assembly is time-consuming and labor-intensive, is not conducive to on-site construction operations.

Therefore, it is desirable to provide a connector for framing material to mitigate and/or obviate the aforementioned problems.

SUMMARY OF INVENTION

An objective of present invention is to provide a connector for framing material which is capable of improving the above-mention problems.

In order to achieve the above mentioned objective, a connector for framing material includes:
a limiting member having a plate member, the plate member provided with a through aperture, a first stopping plate provided at a side of the plate member and a second stopping plate provided at another side of the plate member, the plate member, the first stopping plate and the second stopping plate forming a containing space, each end of the first stopping plate and the second stopping plate respectively having an engaging portion and a pressing portion, the engaging portion of the first stopping plate facing the pressing portion of the second stopping plate, the pressing portion of the first stopping plate facing the engaging portion of the second stopping plate; the first stopping plate and the second stopping plate respectively further provided with two engaging slots facing the plate member and disposed among the plate member, the engaging portion and the pressing portion;
a connecting member having a through hole; and
a first screw having a hexagon portion at an end, the first screw placed through the through aperture of the limiting member and the through hole of the connecting member, an end of the first screw passing through the through hole and screwed with a nut, the hexagon portion of the first screw limited between the first stopping plate and the second stopping plate, the containing space allowing the hexagon portion and the limiting member to rotate synchronously.

Other objects, advantages, and novel features of invention will become more apparent from the following detailed description when taken in conjunction with the accompanying drawings.

DETAILED DESCRIPTION OF PREFERRED EMBODIMENT

Figure 1:
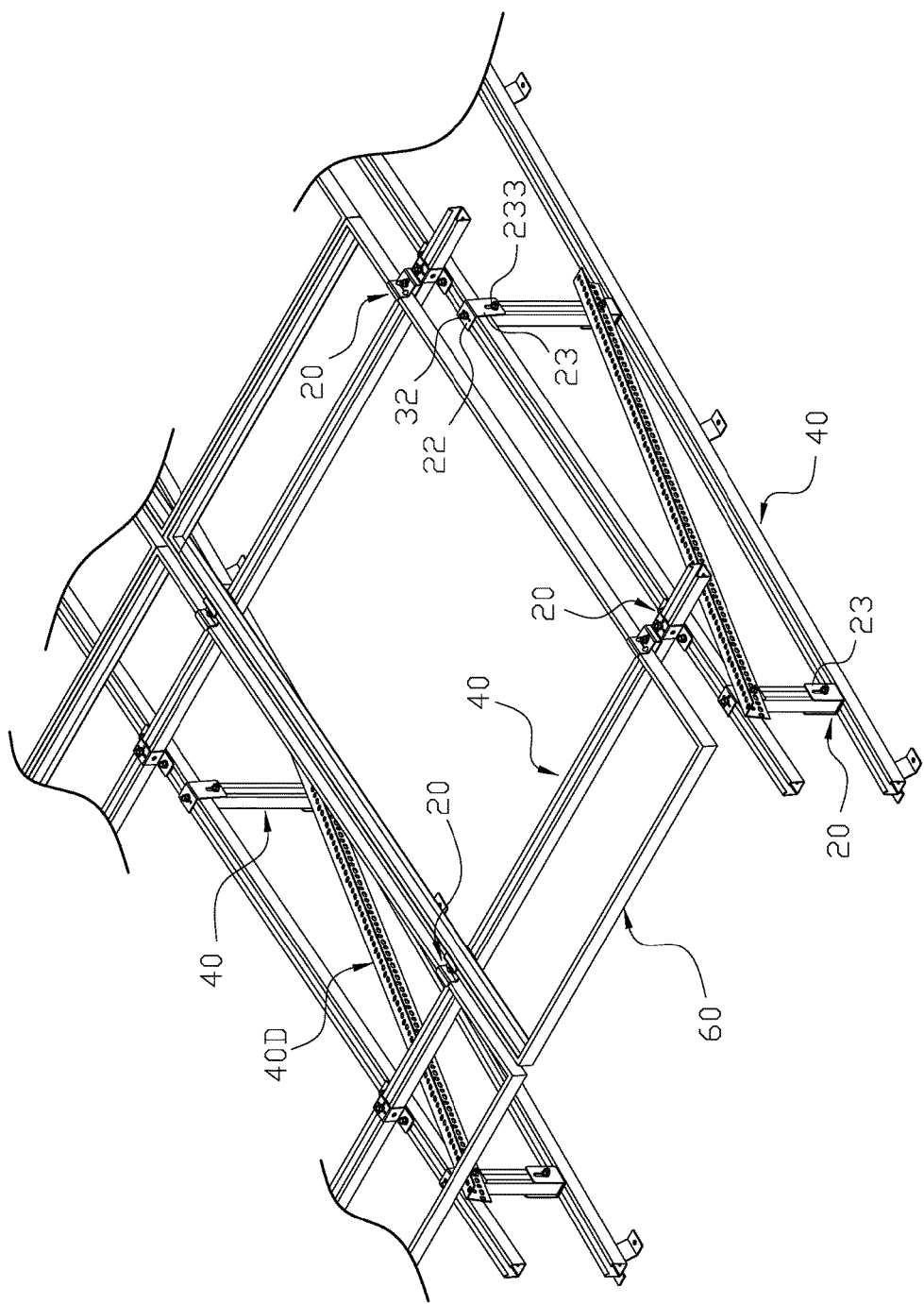
FIG. 1 is a perspective view of a frame structure according to the present invention.
Figure 2:
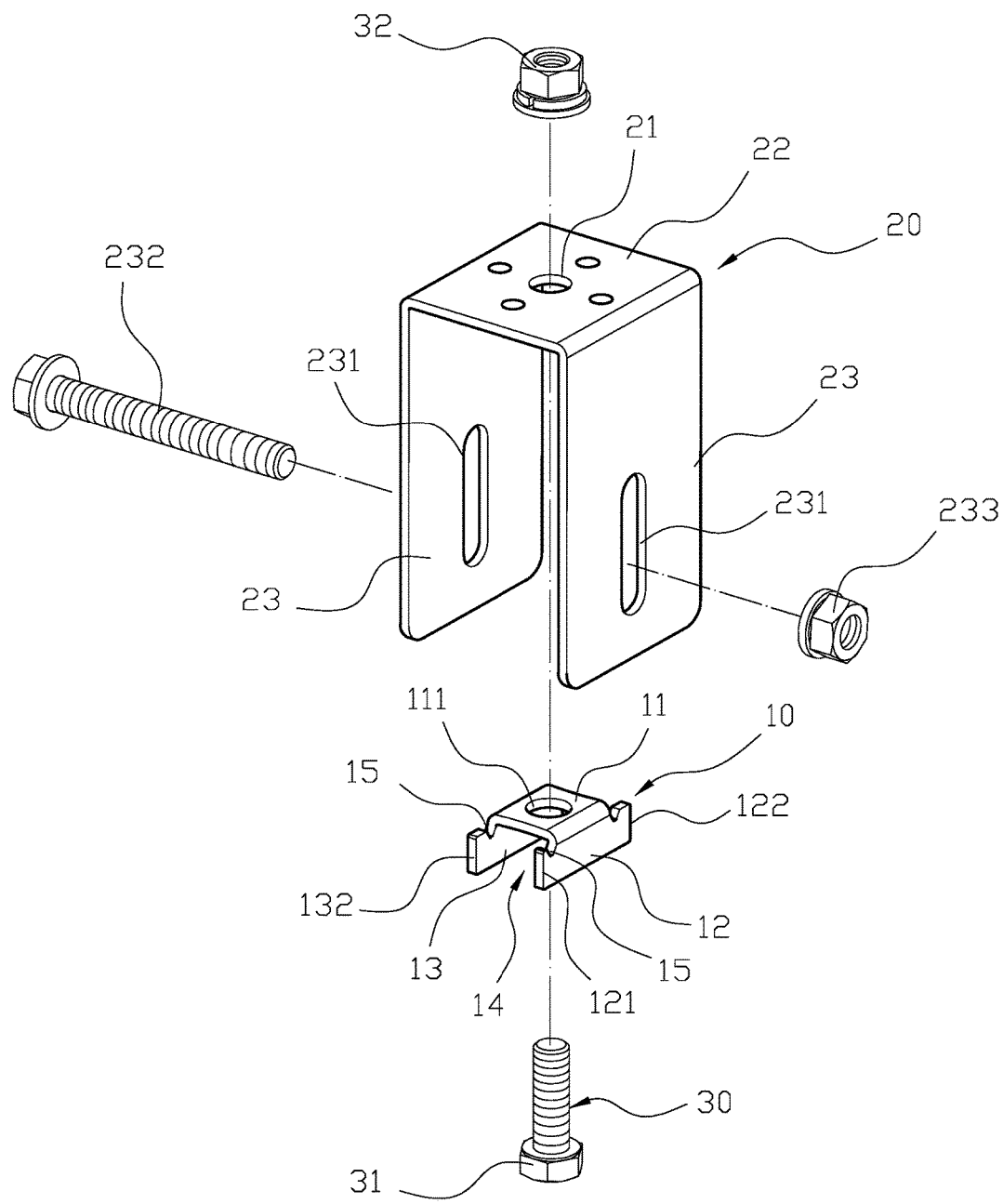
FIG. 2 is an exploded perspective view of a connector according to a first embodiment of the present invention.
Figure 3:
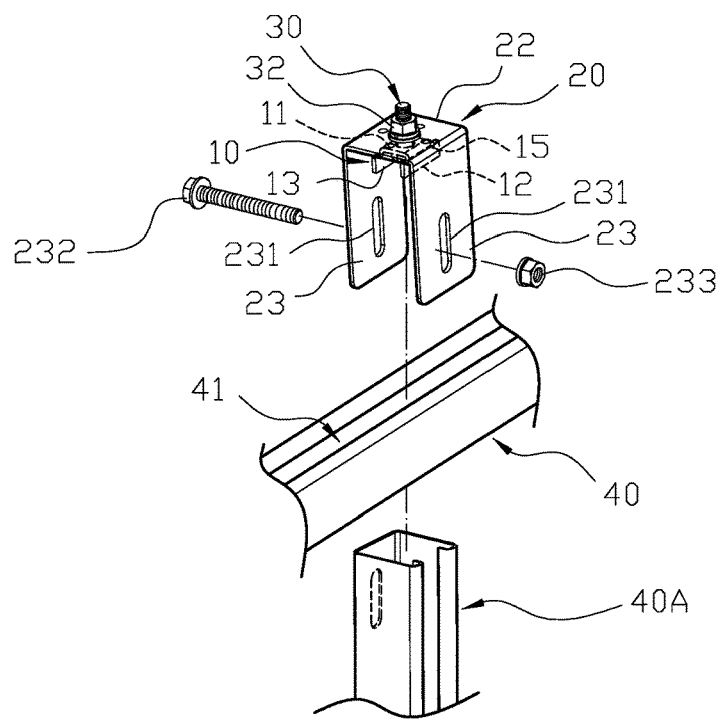
FIG. 3 is an assembly exploded view of the connector according to the first embodiment of the present invention.
Figure 4:
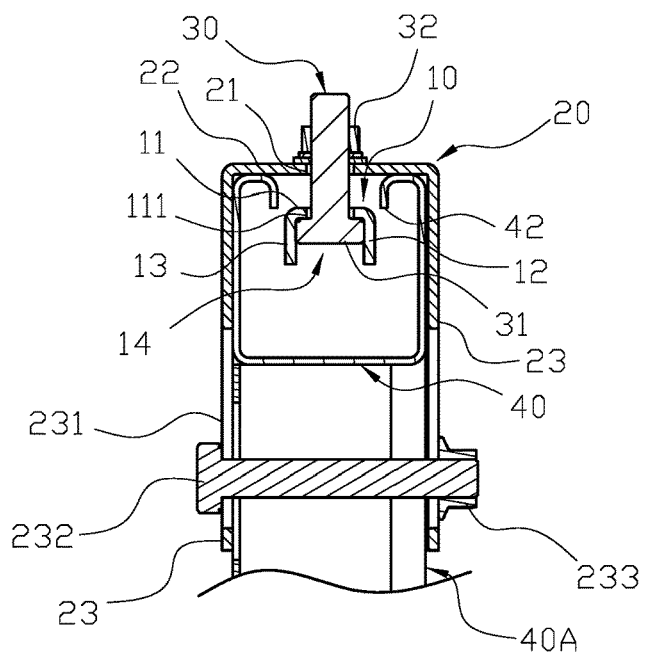
FIG. 4 is a schematic diagram of the assembly according to the first embodiment of the present invention.
Figure 5:
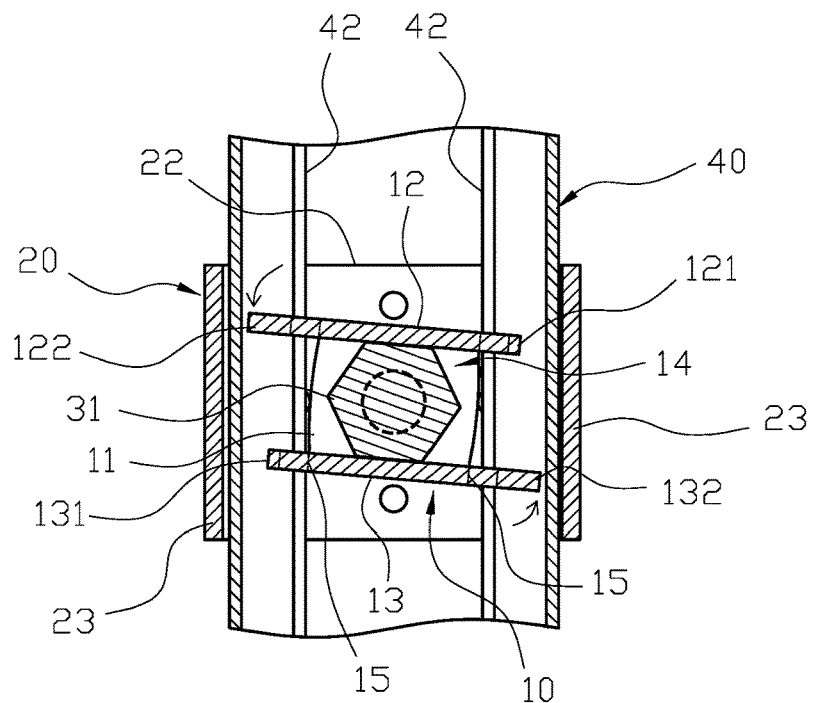
FIG. 5 is another schematic diagram of the assembly steps according to the first embodiment of the present invention.
Figure 6:
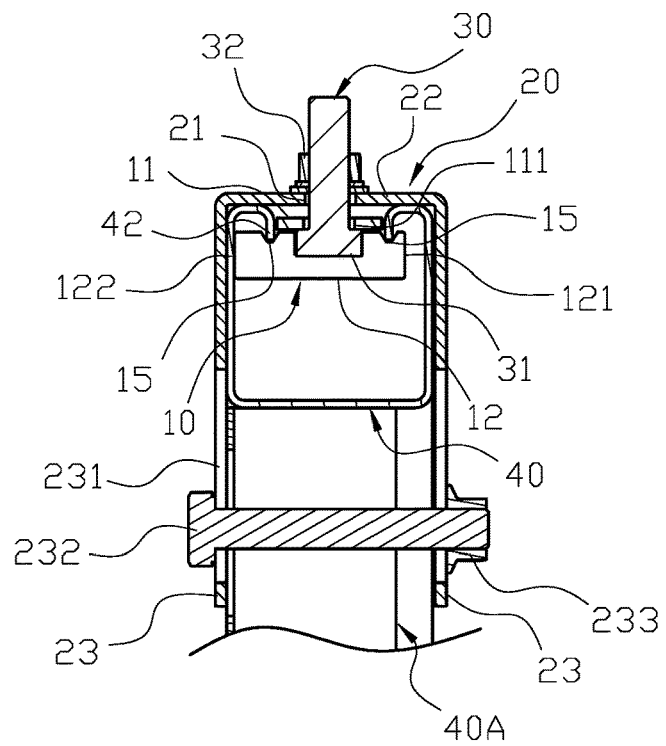
FIG. 6 is another schematic view of the assembly according to the first embodiment of the present invention.
Figure 7:
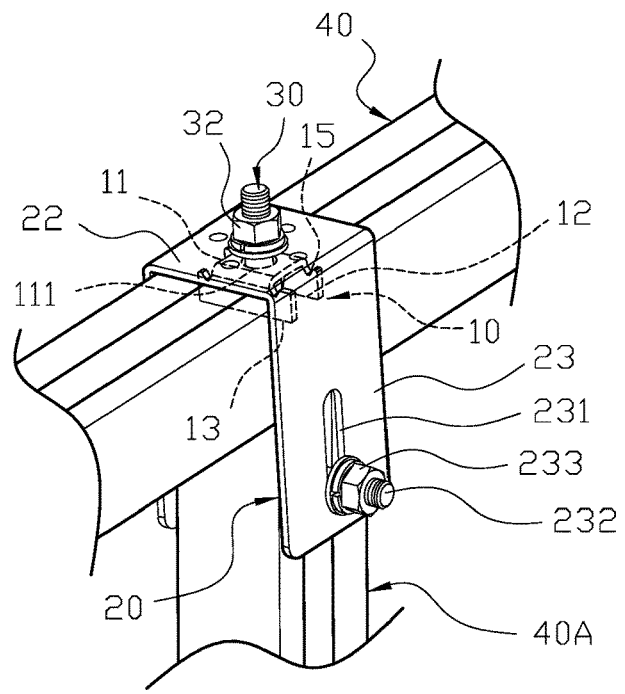
FIG. 7 is a perspective view of the assembled connector according to the first embodiment of the present invention.

Please refer to FIG. 1 and FIG. 2. A connector for framing material comprises: a limiting member 10, a connecting member 20 and a first screw 30. The limiting member 10 has a plate member 11, and the plate member 11 is provided with a through aperture 111. A first stopping plate 12 is provided at a side of the plate member 11 and a second stopping plate 12 is provided at another side of the plate member 11. The plate member 11, the first stopping plate 12 and the second stopping plate 13 all together form a containing space 14. Each end of the first stopping plate 12 and the second stopping plate 13 respectively have an engaging portion 121, 131 and a pressing portion 122, 132. The engaging portion 121 of the first stopping plate 12 faces the pressing portion 132 of the second stopping plate 13, and the pressing portion 122 of the first stopping plate 12 faces the engaging portion 131 of the second stopping plate 13. The first stopping plate 12 and the second stopping plate 13 is respectively further provided with two engaging slots 15 facing the plate member 11 and disposed among the plate member 11, the engaging portions 121, 131 and the pressing portions 122, 132. The connecting member 20 further has a through hole 21. Also, the connecting member 20 has a bottom plate 22 and two opposing sidewalls 23, and the two sidewalls 23 are perpendicularly connected with the bottom plate 22. The through hole 21 is disposed in the bottom plate 22, and both of the sidewalls 23 are respectively provided with an elongate slot 231 correspondingly engaged with a second screw 231 and second nut 233. The first screw 30 has a hexagon portion 31 at an end. The first screw 30 is placed through the through aperture 111 of the limiting member 10 and the through hole 21 of the connecting member 20. An end of the first screw 30 passes through the through hole 21 and is screwed with a nut 32. The hexagon portion 31 of the first screw 30 is limited between the first stopping plate 12 and the second stopping plate 13, and the containing space 14 allows the hexagon portion 31 and the limiting member 10 to rotate synchronously. Please also refer to FIG. 6. The engagement of the first screw 30 and the nut 32 allows the connecting member 20 and the limiting member 10 to hold at least one U-shaped frame 40, and the U-shaped frame 40 is provided with an accepting slot 41 and two hooks 42 on each side of the accepting slot 41. Moreover, the engaging slots 15 of the limiting member 10 engage with the hooks 42 via the first screw 30.

For actual assembly, please refer to FIG. 1-FIG. 7. The first screw 30 extends through the through aperture 111 from the limiting member 10 with the first stopping plate 12 and the second stopping plate 13, and the hexagon portion 31 of the first screw 30 is received in the containing space 14. The first screw 30 is further inserted through the through hole 21 of the connecting member 20 and locked with the connecting member 20 by the nut 32 such that the limiting member 10 is disposed between both sidewalls 23. Therefore, the limiting member 10 and the connecting member 20 are connected in series by the first screw 30 and the nut 32 so that the limiting member 10 can be hung on the connecting member 20 by the nut 32 in order to form a pre-locking assembly of the limiting member 10 and the connecting member 20. When assembling the U-shaped frame 40, the first and the second stopping plates 12, 13 of the limiting member 10 and the sidewall 23 of the connecting member 20 are adjusted to be parallel to each other, then the first the stopping plate 12 and the second stopping plate 13 are disposed in the U-shaped frame 40 along the direction of the accepting slot 41, and the sidewall 23 of the connecting member 20 is also sleeved on the U-shaped frame 40. The hook 42 of the U-shaped frame 40 is spaced between the limiting member 10 and the bottom plate 22, the first stopping plate 12 and the second stopping plate 13 of the limiting member 10 sandwich the hexagon portion 31 of the first screw 30 such that the first the nut 32 can drive the limiting member 10 to rotate to a position perpendicular to the U-shaped frame 40. Meanwhile, the engaging portions 121, 131 of the limiting member 10 can reach into the inner wall of the U-shaped frame 40 so that the pressing portions 122, 132 can be pressed against the inner wall of the U-shaped frame 40 to limit the rotation of the first screw 30. In result, the nut 32 can directly lock the limiting member 10 and the connecting member 20, thereby completing positioning easily without further restraining the limiting member 10. Since the first screw 30 can not rotate due to the blocking of the hexagon portion 31 by the containing space 14 of the limiting member 10 and the blocking of the U-shaped frame 40 to the limiting member 10, the nut 32 to be directly locked with the coupling member 20 and the limiting member 10, and the hook 42 of the U-shaped frame 40 are tightly engaged with the engaging slot 15 of the limiting member 10. Thereby, a stable clamping and fixing is provided to the U-shaped frame 40. Then another U-shaped frame 40A is inserted between the sidewalls 23 of the connecting member 20, a second screw 232 and a second nut 233 are employed to lock two U-shaped frames (40) (40A) to form a T-shaped connection through the elongate slot 231 of the sidewall 23 so as to achieve easy assembly and improve the bonding strength.

Figure 8:
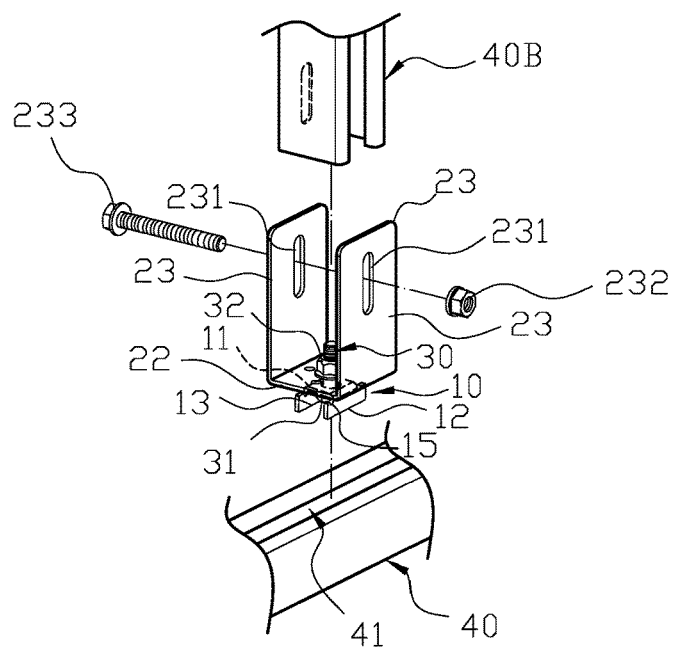
FIG. 8 is an exploded view of another assembled connector according to the first embodiment of the present invention.
Figure 9:
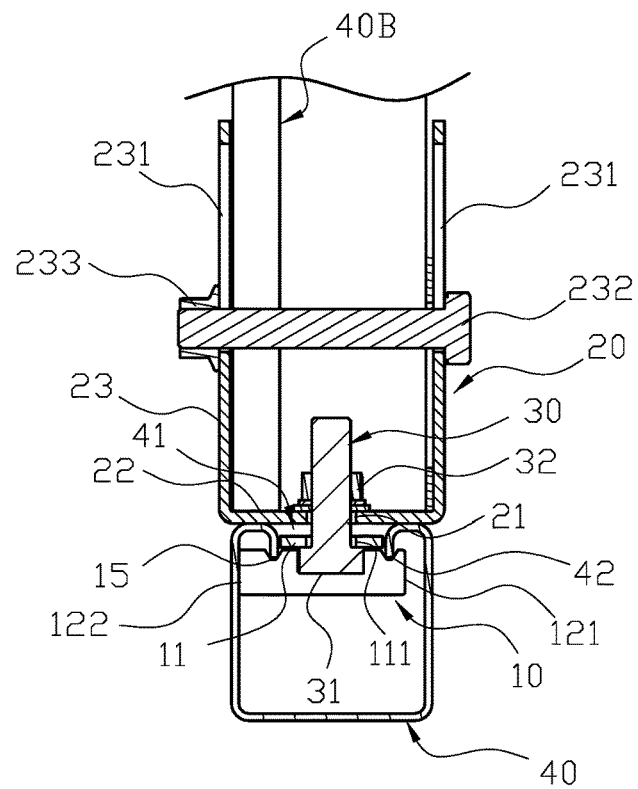
FIG. 9 is a combined cross-sectional view of another assembled connector according to the first embodiment of the present invention.
Figure 10:
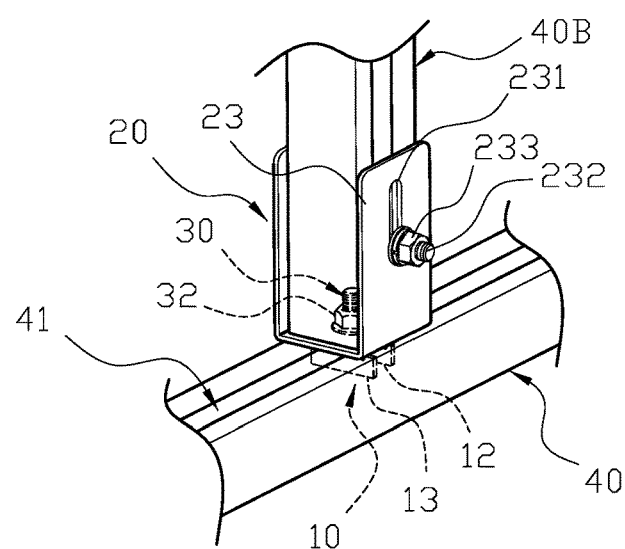
FIG. 10 is a combined perspective view of another assembled connector according to the first embodiment of the present invention.

Another assembly option of the present invention, please refer to FIGS. 8-10 with FIG. 2, the first screw 30 extends from a side of the limiting member 10 having the first stopping plate 12 and the second stopping plate 13 through the through aperture 111, and the hexagon portion 31 of the first screw 30 is sandwiched between the first stopping plate 12 and the second stopping plate 13. Moreover, the first screw 30 is further inserted through the through hole 21 of the connecting member 20, so that the nut 32 can lock with the first screw 30 between the two sidewalls 23 of the connecting member 20 thereby forming the pre-locking assembly of the limiting member 10 and the connecting member 20. At the on-site construction, the limiting member 10 is placed in the accepting slot 41 of the U-shaped frame 40, the first screw 30 drives the limiting member 10 to rotate and position so as to lock the first screw 30 and the nut 32 to form the engagement of the fastening slot 15 of the limiting member 10 and the hook 42 of the U-shaped frame 40. With the bottom plate 22 of the connecting member 20, the U-shaped frame 40 is sandwiched, and the connecting member 20 of the sidewall 23 can be used to connect to another U-shaped frame 40B, to achieve the purpose of inverted T-shaped steel frame.

Figure 11:
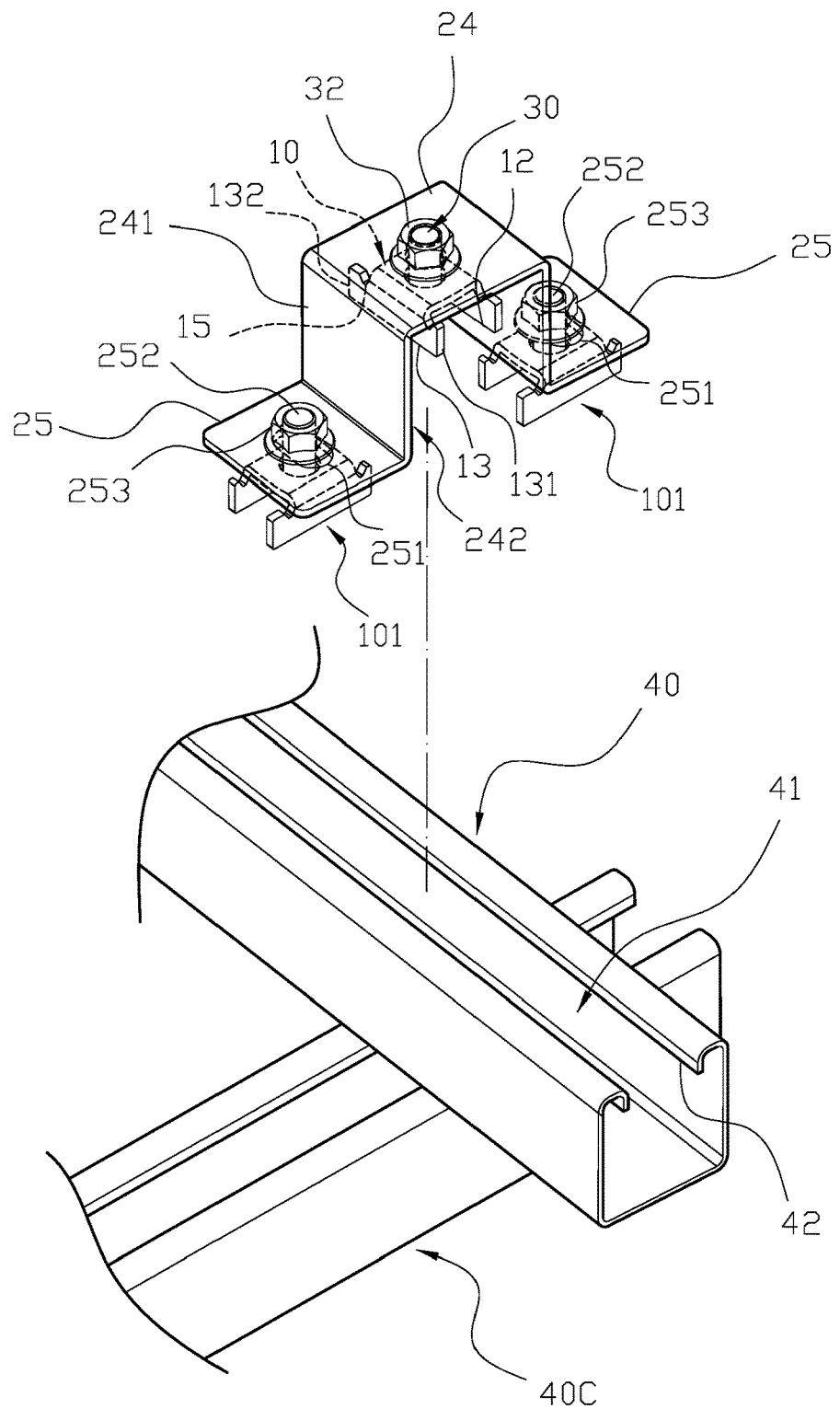
FIG. 11 is a schematic drawing of the assembly according to a second embodiment of the present invention.
Figure 12:
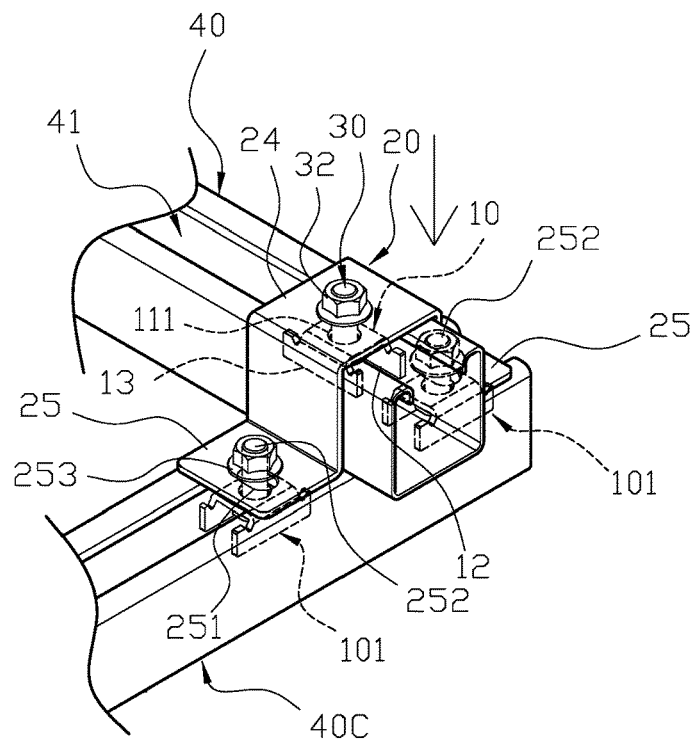
FIG. 12 is another schematic drawing of the assembly according to the second embodiment of the present invention.
Figure 13:
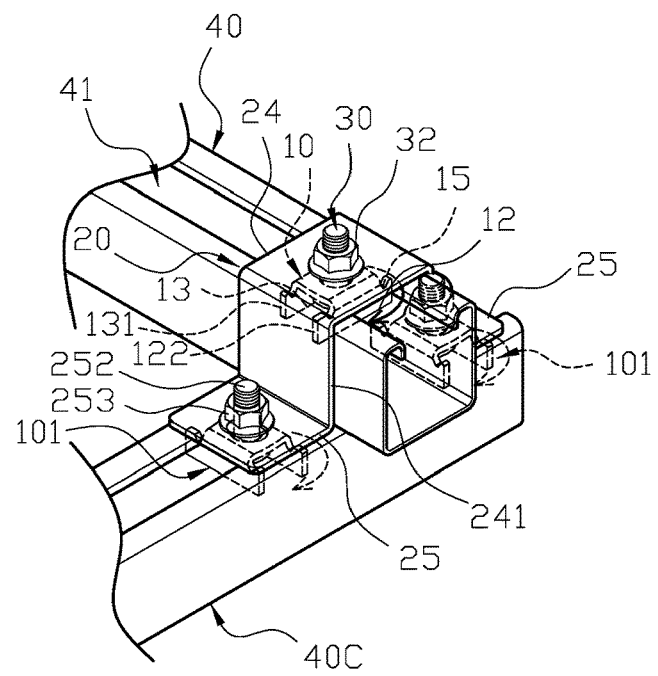
FIG. 13 is an assembly perspective view of the connector according to the second embodiments of the present invention.

A second embodiment of the present invention, please refer to FIG. 11, FIG. 12 and FIG. 13. The connecting member 20 is integrally formed with a top plate 24 at the center and two press plates 25 on two opposing sides, the two press plates 25 are located in the same plane and parallel to the top plate 24, and two vertical plates 241 are perpendicularly connected the top plate 24 and the press plate 25. A stop space 242 is formed by the top plate 24 and the vertical plate 241, the through hole 21 is opened at the center of the top plate 24, and the press plate 25 is provided with an adjusting aperture 251, and the adjusting aperture 251 is provided with a third screw 252 and a third nut 253. The third screw 252 is placed through a positioning member 101 and locked with the third nut 253 such that the connecting member 20, the limiting member 10 and the positioning member 101 can be pre-locked together before being constructed to reduce assembly time during on-site construction. The positioning member 101 is equivalent to the structure and function of the limiting member 10. The positioning member 101 is provided with the first stopping plate 12 and the second stopping plate 13 for blocking the third screw 252, the engaging portions 121, 131 and the pressing portions 122, 132 capable of dodging and pressing inside the U-shaped frame 40, and the engaging slot 15 capable of engaging with the hook 42 of the U-shaped frame 40. When the construction is carried out in the field, both the limiting member 10 and the positioning member 101 can be easily rotated to be able to be placed in the U-shaped frames 40 40C, the limiting member 10 is placed in the U-shaped frame 40 and the positioning member 101 is placed in a U-shaped frame 40C disposed in a cross with the U-shaped frame 40, and the stopping space 242 of the connecting member 20 sandwiches the U-shaped frame 40. Therefore, the nut 32 and the third nut 253 can be rapidly locked, and the limiting member 10 and the two positioning members 101 are all engaged with to the U-shaped frames 40, 40C, thereby achieving the U-shaped frame 40 with a U-shaped frame 40C to form cross-shaped connection.

Figure 14:
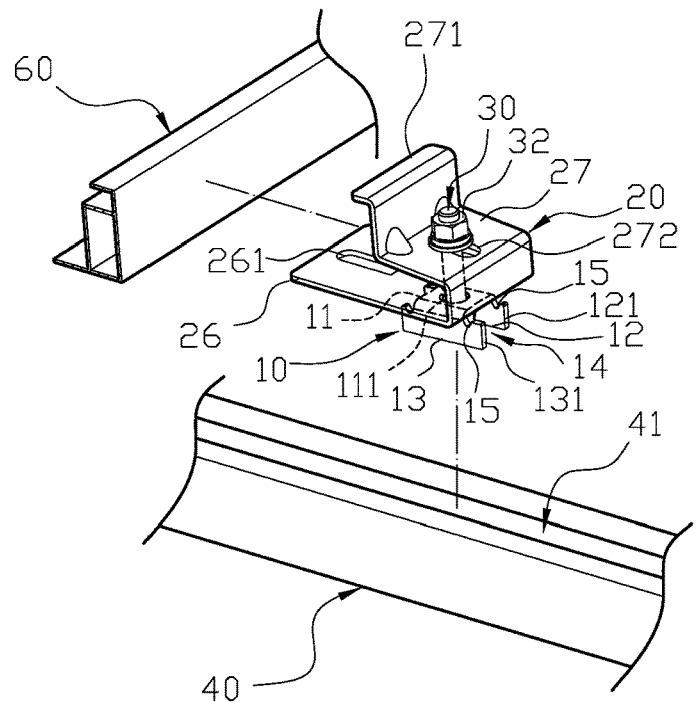
FIG. 14 is a schematic diagram of the assembly of the connector according to a third embodiments of the present invention.
Figure 15:
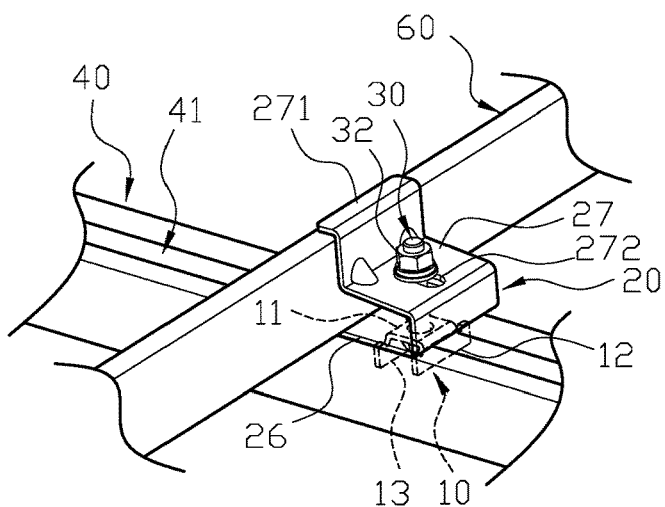
FIG. 15 is an assembled perspective view of the connector according to the third embodiment of the present invention.

In the third embodiment of the present invention, as shown in FIGS. 14 and 15. The connecting member 20 is integrally formed such that an elastic sheet 27 is partially overlapped on the side of the bottom sheet 26. Another side of the elastic sheet 27 is provided with a compress plate 271, and the through hole 21 is opened on the bottom sheet 26. The elastic sheet 27 is provided with an oval-shaped aperture 272 relative to the through hole 21 so that the first screw 30 passes through the through hole 21 and the oval-shaped aperture 272. The elastic deformation of the elastic sheet 27 is formed when the nut 32 is locked with the first screw 30, so that the compressible plate 271 and the bottom sheet 26 are clamped to each other. For actual assembly, the limiting member 10 can be pre-locked on the connecting member 20 and directly placed in the U-shaped frame 40, and then the first screw 30 is rotated to position the limiting member 10 in the U-shaped frame 40. Furthermore, a solar panel 60 is placed between the bottom sheet 26 of the connecting member 20 and the compress plate 271, the first screw 30 and the nut 32 together compress the elastic sheet 27 to lock the U-shaped frame 40 and the solar panel 60 together. Moreover, the bottom sheet 26 of the connecting member 20 is further provided with a screw hole 261, and the solar panel 60 can be locked at the screw hole 261 to achieve more stability.

Figure 16:
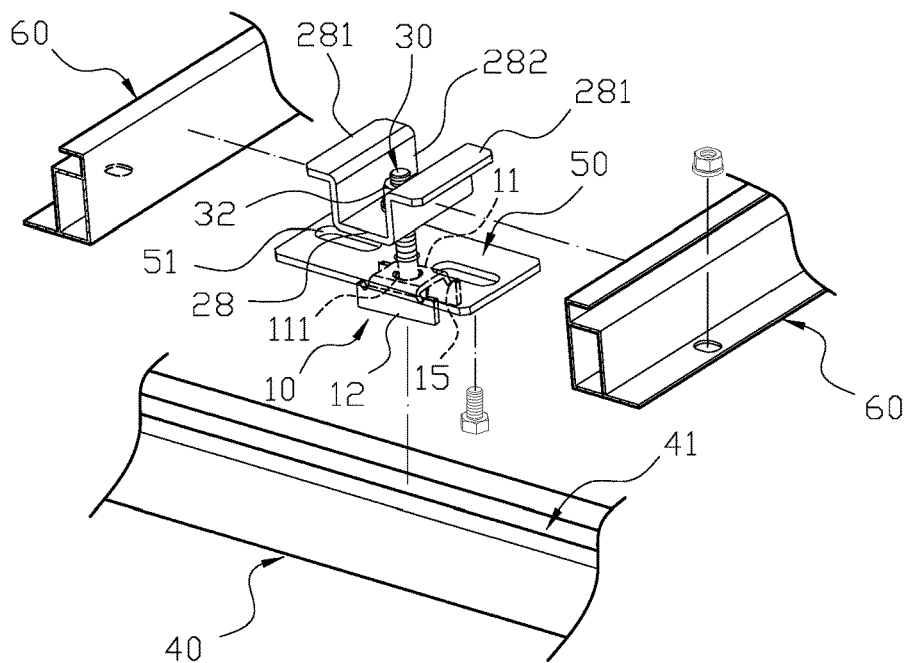
FIG. 16 is a schematic diagram of the assembly of the connector according to a fourth third embodiments of the present invention.
Figure 17:
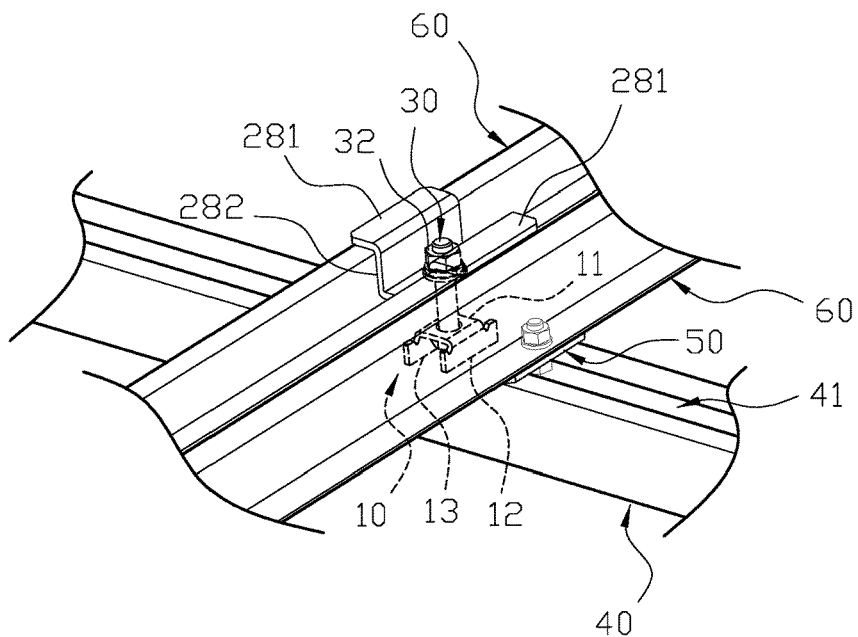
FIG. 17 is an assembled perspective view of the connector according to the fourth embodiment of the present invention.
Figure 18:
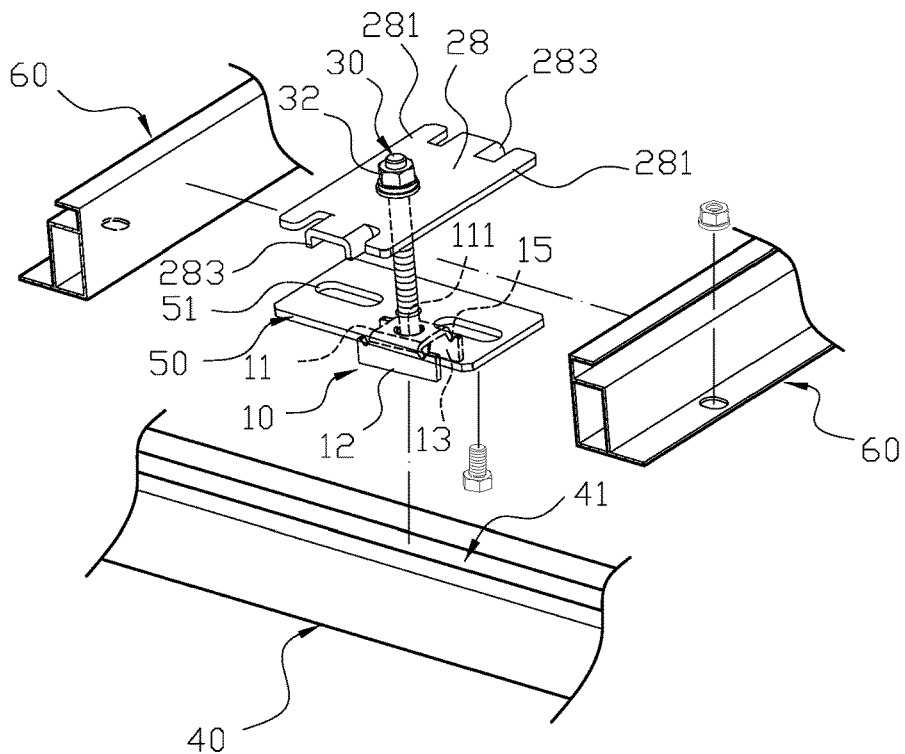
FIG. 18 is a schematic drawing of another assembled state of the connector according to the present invention.
Figure 19:
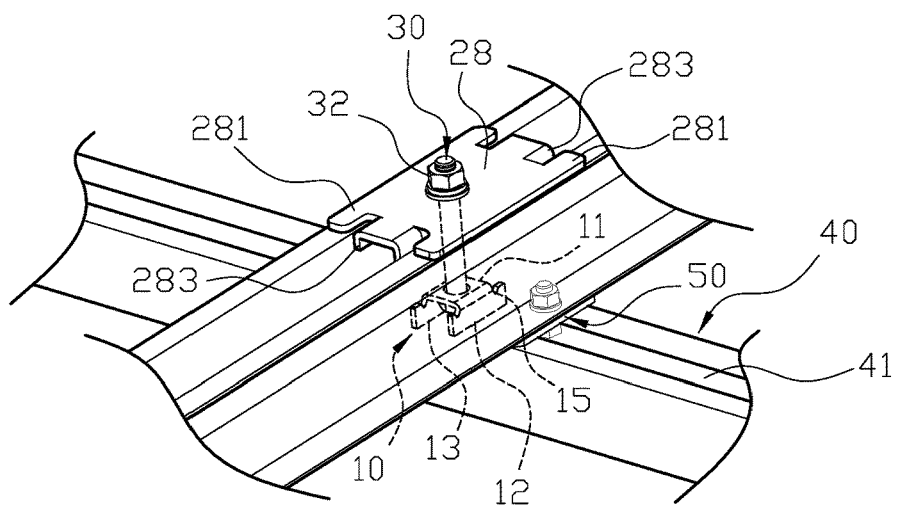
FIG. 19 is a perspective view of assembled state of the connector according to the present invention.
Figure 20:
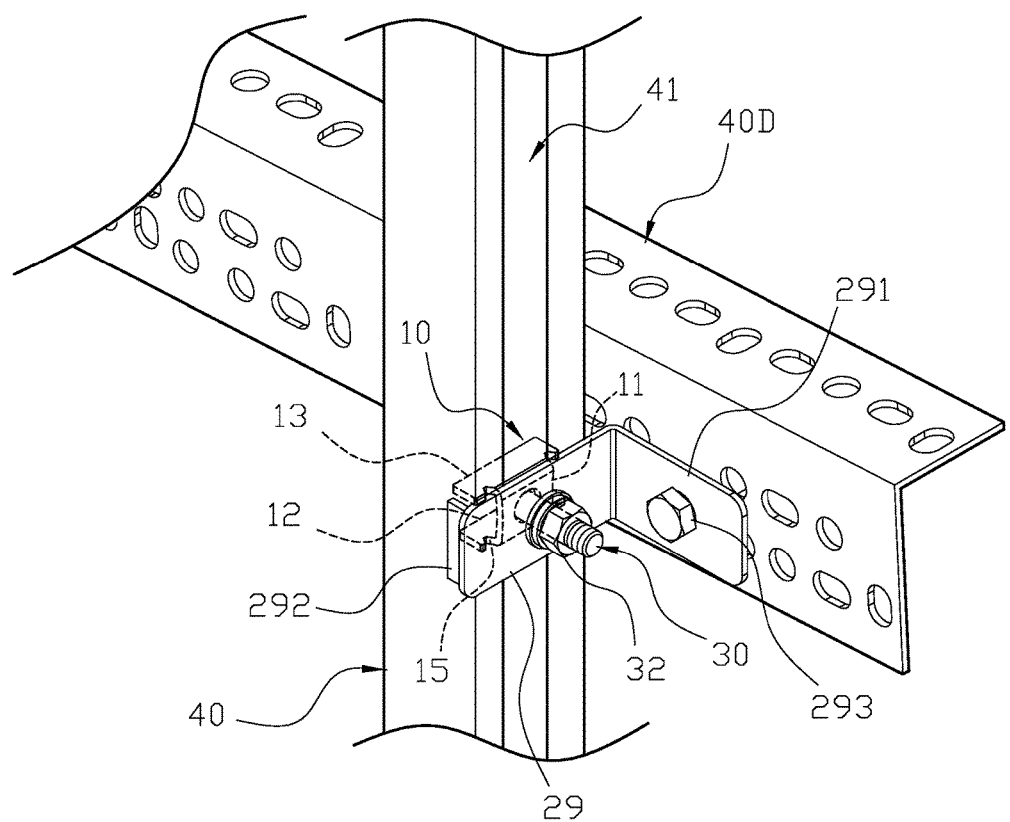
FIG. 20 is a perspective view of the connector according to a fifth embodiment of the present invention.

A fourth embodiment of the present invention is shown in FIG. 16 and FIG. 17. A plate 50 can be added into the assembly, the plate 50 is placed between the limiting member 10 and the connecting members 20 and passed by the first screw 30, and the plate 50 is provided with a plurality of locking apertures 51. The connecting member 20 is integrally formed with a flat plate 28 and two holding sheets 281 on both sides, when the nut 32 is locked with first screw 30, the holding sheet 281 and the plate 50 are paired to be able to sandwich the two solar panels 60 at two ends of the holding sheets 281 to achieve two-way fixation of the solar planes 60. The flat plate 28 and the holding sheet 281 are formed on different panels but parallel with each other, and a stopping wall 282 is formed between the flat plate 28 and the holding sheet 281. The solar panel 60 can be blocked by the stopping wall 282, thereby limiting the fixed position of the solar panel 60 and further preventing the solar panel 60 from generating movements. As shown in FIGS. 18 and 19, the flat plate 28 is formed on the same plane as the holding sheet 281, and the flat plate 28 is bent to from at least a gap 283 configured for preventing the movement of the solar panel 60. In a fifth embodiment of the present invention, as shown in FIG. 20, the connecting member 20 is formed with an a bottom plate 29 and a side plate 291 in an L shape, and the through hole 21 is opened on the bottom plate 29. The bottom plate 29 is provided with a blocking plate 292 perpendicularly, and the side plate 291 is engaged with a locking member 293. With the above structure, the limiting member 10 is able to pair with the bottom plate 29 of the connecting member 20 to hold the U-shaped frame 40. Moreover, the blocking plate 292 pushes against on an outer side of the U-shaped frame 40 to secure the position of the side plate 291 so that the locking member 293 can be locked with an L-shaped frame 40D to improve the assembly strength.

Figure 21:
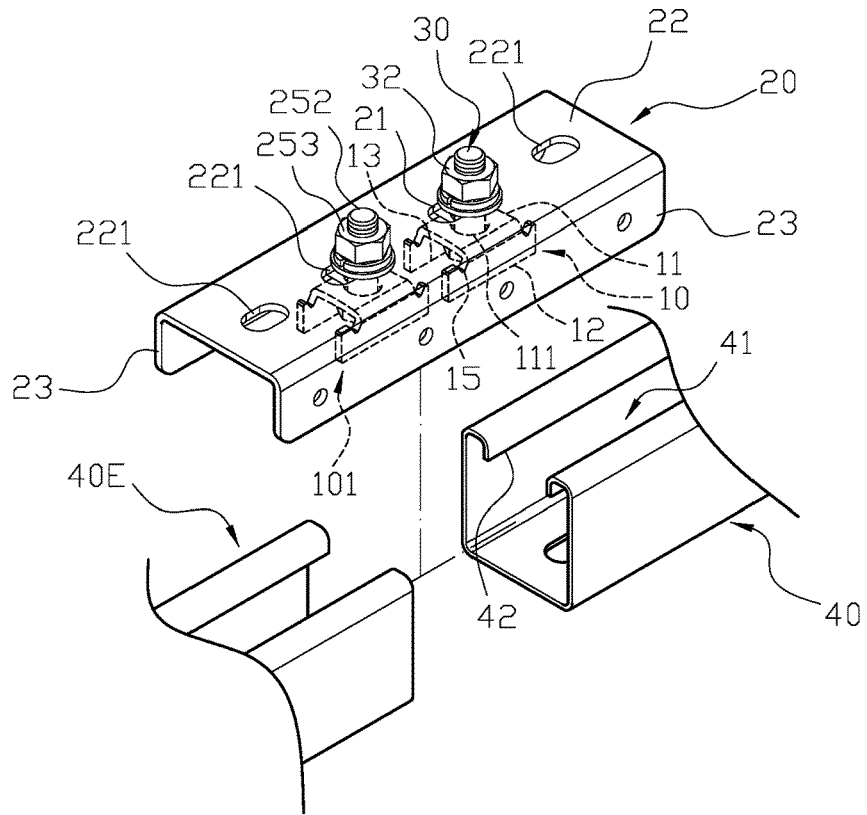
FIG. 21 is a schematic view showing the assembly of a sixth embodiment of the present invention.
Figure 22:
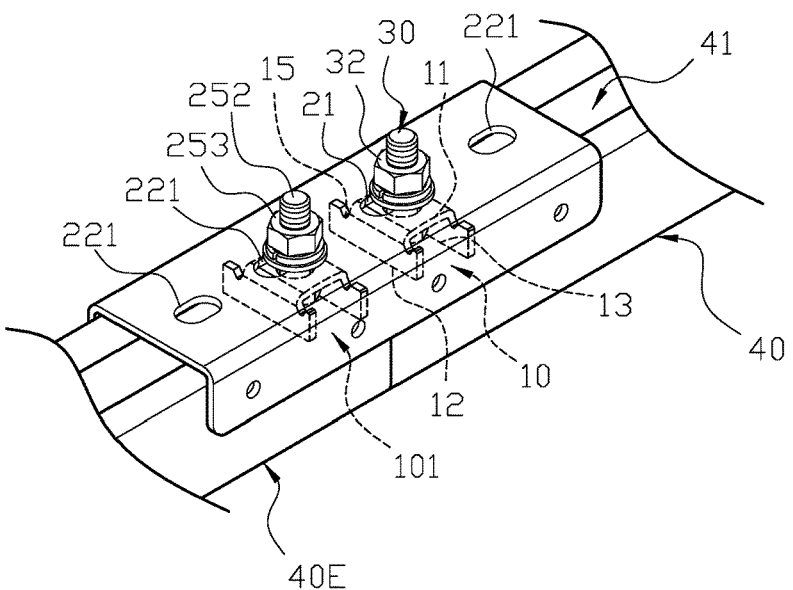
FIG. 22 is a perspective view of the sixth embodiment of the present invention.
Figure 23:
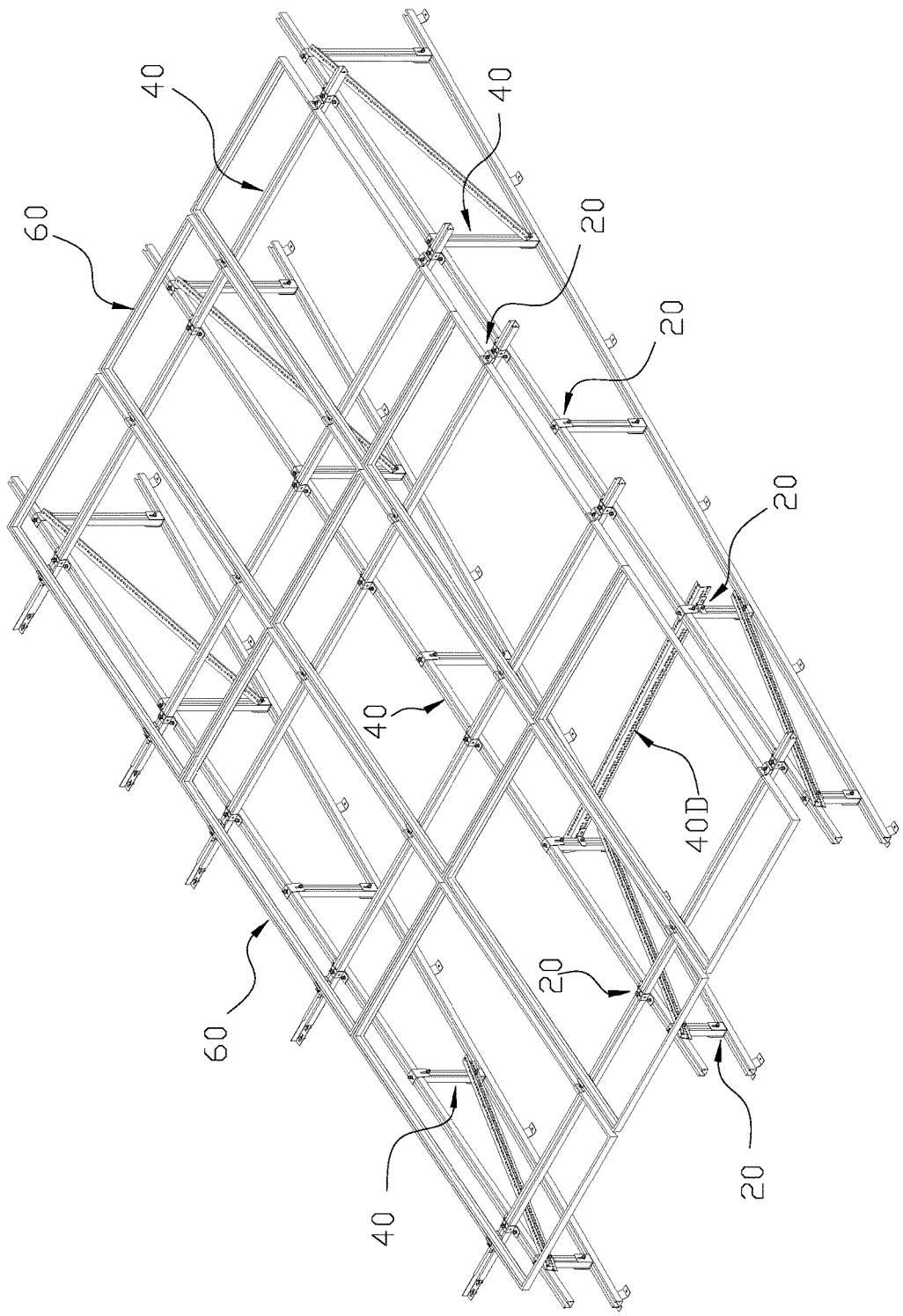
FIG. 23 is an overall perspective view of the assembled frame structure according to the present invention.
Figure 24:
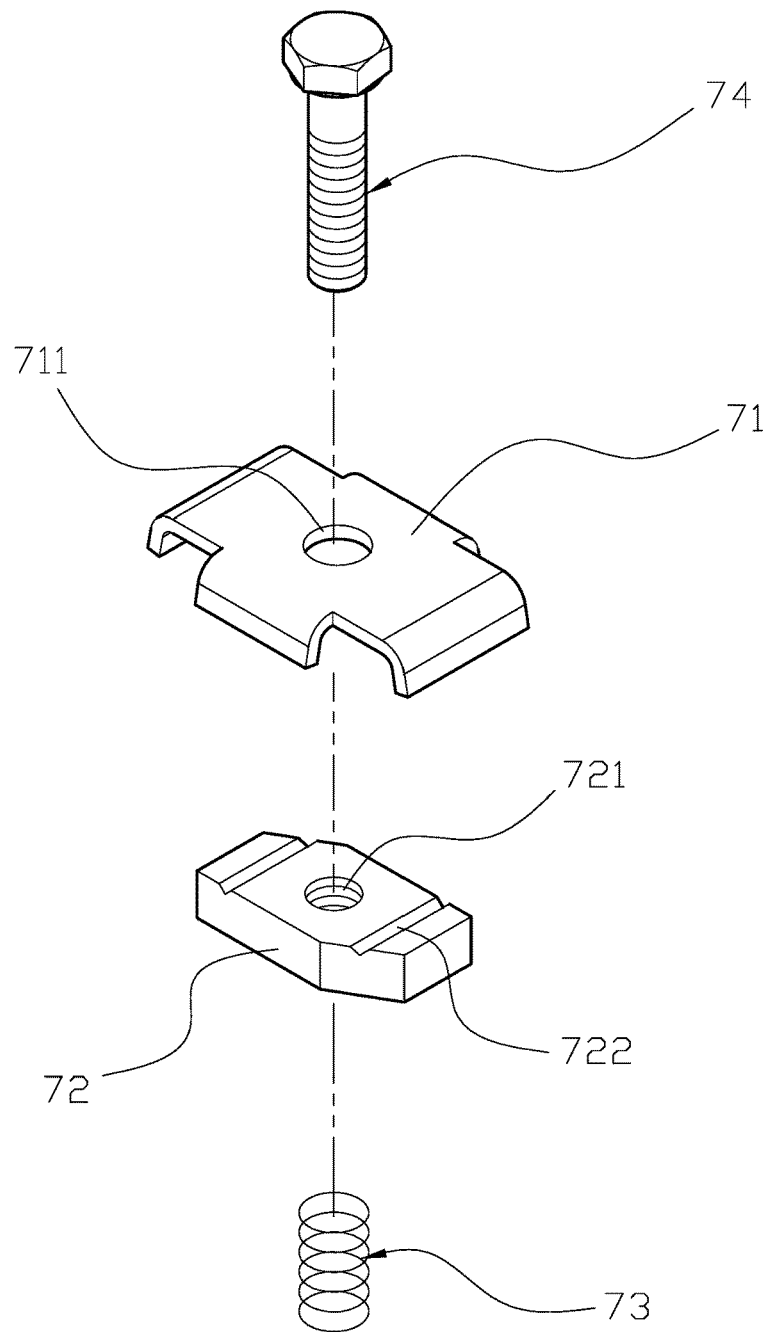
FIG. 24 is a three-dimensional exploded view of the prior art.
Figure 25:
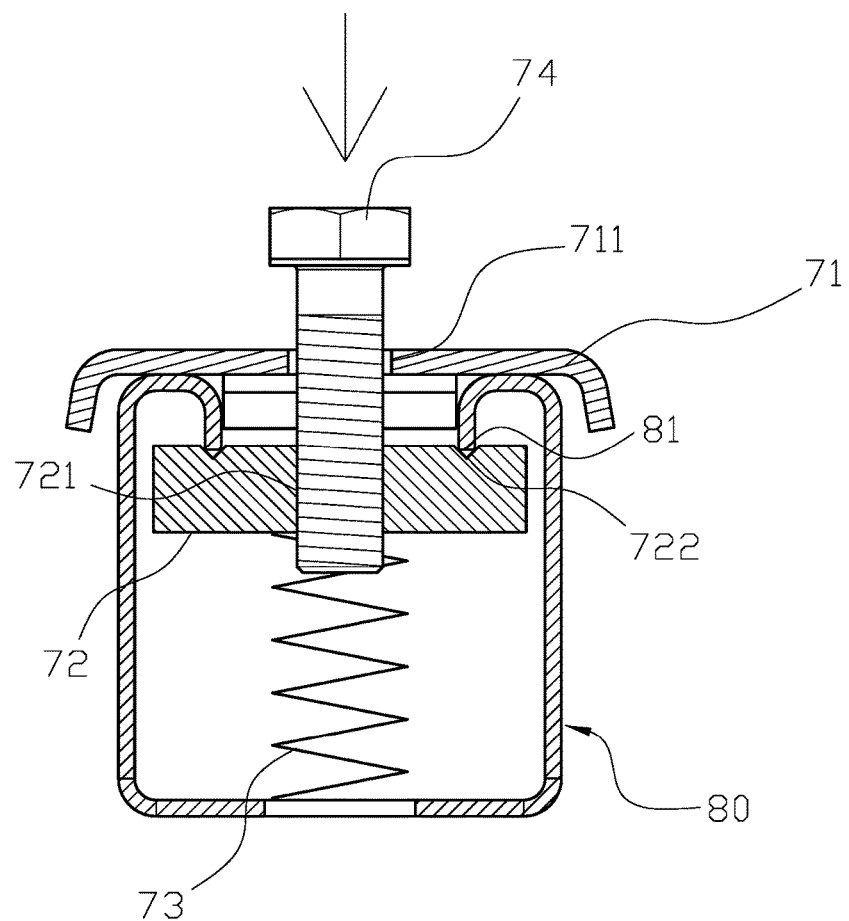
FIG. 25 is a cross-sectional view of the prior art.

In a sixth embodiment of the present invention, as shown in FIG. 21 and FIG. 22, the connecting member 20 is integrally formed with the bottom plate 22 in the middle and the two sidewalls 23 on two opposing sides, and the two the sidewalls 23 are formed in a right angle with the bottom plate 22. The through hole 21 is opened at the bottom plate 22, the bottom plate 22 is further provided with at least one through aperture 221, and the through aperture 221 is locked with a third screw 252 and a third nut 253. A positioning member 101 is also locked between the third screw 252 and the third nut 253, and the positioning member 101 is equivalent to the structure and function of the limiting member 10. Therefore, the connecting member 20, the limiting member 10 and the positioning member 101 all can be pre-locked together before construction. When the construction is performed on site, the limiting member 10 and the positioning member 101 can be easily rotated to be accommodated into the U-shaped frames 40, 40E. The limiting member 10 is placed into the U-shaped frame 40 and the positioning member 101 is placed in another U-shaped frame 40E arranged in a straight line, and the U-shaped frames 40, 40E are sandwiched by the two sidewalls 23 of the connecting member 20 so it's easy to quickly lock the nut 32 and the third nut 253 together. In result, the limiting member 10 and the two positioning members 101 altogether sandwich the U-shaped frames 40, 40E together, thereby achieving easy in-line assembly of the U-shaped frame 40 and another U-shaped frame 40E.

Finally, as shown in FIG. 1 to FIG. 23, the first stopping plate 12 and the second stopping plate 13 of the limiting member 10 form the containing space 14, the containing space 14 limits the hexagon portion 31 of the first screw 30, the first screw 30 passes through the through hole of the connecting member 20, and the first screw 30 is correspondingly locked with the nut 32, whereby the limiting member 10 and the connecting member 20 can be easily pre-assembled. The limiting member 10 can be easily positioned onto the U-shaped frame 40 by the first screw 30, thereby it greatly improves the assembly efficiency of on-site construction. Furthermore, the T-shaped connection, cross connection and in-line connection all can be achieved through the different forms of connecting members 20, and the solar panel 60 can also be in a one-way fixation and a bidirectional fixation assembly, which improves the assembly efficiency and reduce the cost of site assembly efficiency.

Although the present invention has been explained in relation to its preferred embodiment, it is to be understood that many other possible modifications and variations can be made without departing from the spirit and scope of invention as hereinafter claimed.

What is claimed is:

1. A connector for framing material comprising:
a limiting member having a plate member, the plate member provided with a through aperture, a first stopping plate provided at a side of the plate member and a second stopping plate provided at another side of the plate member, the plate member, the first stopping plate and the second stopping plate forming a containing space, each end of the first stopping plate and the second stopping plate respectively having an engaging portion and a pressing portion, the engaging portion of the first stopping plate facing the pressing portion of the second stopping plate, the pressing portion of the first stopping plate facing the engaging portion of the second stopping plate, the first stopping plate and the second stopping plate respectively further provided with two engaging slots facing the plate member and disposed among the engaging portion and the pressing portion;
a connecting member having a through hole; and
a first screw having a hexagon portion at an end, the first screw placed through the through aperture of the limiting member and the through hole of the connecting member, an end of the first screw passing through the through hole of the connecting member and screwed with a nut, the hexagon portion of the first screw limited between the first stopping plate and the second stopping plate, the containing space allowing the hexagon portion and the limiting member to rotate synchronously;
wherein the connecting member has a bottom plate and two opposing sidewalls, the two sidewalls perpendicularly connected with the bottom plate, the through hole disposed in the bottom plate, and both of the sidewalls are respectively provided with an elongate slot correspondingly engaged with a second screw and second nut.

2. The connector for framing material as claimed in claim 1, wherein the engagement of the first screw and the nut allows the connecting member and the limiting member to hold at least one U-shaped frame, the U-shaped frame provided with an accepting slot and two hooks on each side of the accepting slot, and the engaging slots of the limiting member engage with the hooks via the first screw.

3. The connector for framing material as claimed in claim 2, wherein the engaging portion of the limiting member is configured to face away from an inner edge of the U-shaped frame, and the pressing portion presses against the inner edge of the U-shaped frame.

4. The connector for framing material as claimed in claim 1, wherein the connecting member has a top plate and two press plates on opposing sides, the two press plates are parallel with the top plate and respectively connected by two perpendicular plates, the through hole is provided at a center position of the top plate, and each press plate is provided with an adjusting aperture; each adjusting aperture is correspondingly locked with a third screw and a third nut, and the third screw and the third nut are placed through a positioning member which corresponds to the limiting member.

5. The connector for framing material as claimed in claim 1, wherein the connecting member has a bottom sheet and a partially overlapping elastic sheet extending from a side, and another side of the elastic sheet includes a compression plate; the through hole is disposed in the bottom sheet, and an oval-shaped aperture is provided on the elastic sheet corresponding to the through hole.

6. The connector for framing material as claimed in claim 1 further comprising:
a plate member placed between the limiting member and the connecting member, the first screw inserted into the plate member, the plate member having a plurality of locking apertures; the connecting member has a flat plate and two opposing holding sheets;
the first screw and the nut hold the holding sheet and the plate member, the flat plate and the holding sheets being parallel, and a stopping wall is provide between the flat plate and the holding sheet.

7. The connector for framing material as claimed in claim 1 further comprising:
a plate member placed between the limiting member and the connecting member, the first screw inserted into the plate member, the plate member provided with a plurality of locking apertures, the connecting member having a flat plate and two opposing holding sheets; the first screw and the nut hold the holding sheet and the plate member, the flat plate and the holding sheets being on an identical surface, and the flat plate provided with a bent portion and a gap.

8. The connector for framing material as claimed in claim 1, wherein the connecting member L-shaped comprising a bottom plate and a side plate, the through hole is disposed in the bottom plate, the bottom plate is provided with a vertical blocking plate, and the side plate is engaged with a locking member.

9. The connector for framing material as claimed in claim 1, wherein the connecting member is U-shaped comprising a bottom plate and two opposing sidewalls, the through hole and the through aperture are separately disposed in the bottom plate, the through aperture is engaged with a third screw and a third nut, and the third screw and the third nut also engage with a positioning member.

* * * * *

UNITED STATES PATENT AND TRADEMARK OFFICE
CERTIFICATE OF CORRECTION

PATENT NO. : 10,364,567 B2  
APPLICATION NO. : 15/854730  
DATED : July 30, 2019  
INVENTOR(S) : Song-Ping Shang Page 1 of 1

It is certified that error appears in the above-identified patent and that said Letters Patent is hereby corrected as shown below:

On the Title Page

The name of the inventor is changed to: Zhi-Cheng Shang

Signed and Sealed this  
Seventh Day of April, 2020

Andrei Iancu  
*Director of the United States Patent and Trademark Office*